United States Patent
Dragic

(10) Patent No.: US 7,697,794 B2
(45) Date of Patent: Apr. 13, 2010

(54) MICROPULSE LIDAR TRANSMITTER BASED ON A LOW-SBS ERBIUM-DOPED SILICA FIBER

(76) Inventor: Peter Dragic, 1307 Bluegrass, Champaign, IL (US) 61821

( * ) Notice: Subject to any disclaimer, the term of this patent is extended or adjusted under 35 U.S.C. 154(b) by 499 days.

(21) Appl. No.: 11/656,813

(22) Filed: Jan. 23, 2007

(65) Prior Publication Data

US 2008/0175595 A1 Jul. 24, 2008

(51) Int. Cl.
G02F 1/335 (2006.01)
H04B 10/12 (2006.01)
G02F 1/33 (2006.01)

(52) U.S. Cl. .......................... 385/7; 385/122; 385/123; 385/126; 385/127; 398/141; 398/143; 398/79; 359/305; 359/334; 359/341.1

(58) Field of Classification Search .................. 385/122, 385/123, 124, 126, 127, 128, 31, 38, 39, 385/7; 398/79, 80, 135, 139, 143, 144, 146, 398/141; 359/305, 285, 333, 334, 341.1, 359/342, 345
See application file for complete search history.

(56) References Cited

U.S. PATENT DOCUMENTS

| 6,347,007 | B1* | 2/2002 | Grubb et al. ............ 359/337.21 |
| 7,558,480 | B2* | 7/2009 | Bickham ...................... 398/37 |
| 7,577,178 | B2* | 8/2009 | Dragic ......................... 372/94 |
| 2003/0030001 | A1* | 2/2003 | Cooper et al. ............. 250/338.5 |
| 2007/0140704 | A1* | 6/2007 | Mauro et al. ................. 398/188 |
| 2008/0175278 | A1* | 7/2008 | Dragic ........................... 372/6 |
| 2008/0175595 | A1* | 7/2008 | Dragic ........................ 398/141 |
| 2009/0142066 | A1* | 6/2009 | Leclair et al. ................ 398/139 |

* cited by examiner

*Primary Examiner*—Brian M Healy
(74) *Attorney, Agent, or Firm*—Carmen Patti Law Group, LLC

(57) ABSTRACT

A narrow-linewidth micropulse LIDAR transmitter based on a low-SBS single clad, small-mode-area optical fiber. High narrow-linewidth peak powers are achieved through the use of an erbium doped fiber with an acoustic waveguide. Over 6 µJ per pulse (100 ns pulse width) is achieved before a weak form of stimulated Brillouin scattering appears. This laser has the potential to scale to very high power in a low-SBS dual clad fiber.

19 Claims, 4 Drawing Sheets

MICROPULSE LIDAR TRANSMITTER BASED ON A LOW-SBS ERBIUM-DOPED SILICA FIBER

BACKGROUND OF THE INVENTION

Fiber Lasers have become very attractive for use in lidar applications. This is due to a number of superior parameters that are characteristic of these lasers, namely high efficiency, small size, and low weight, making them suitable for space applications. Many lidar applications, such as differential absorption (DIAL) and resonance fluorescence, require narrow linewidth operation of the fiber laser (<<100 MHz). For example, the remote detection of $CO_2$ could be facilitated by narrow linewidth erbium doped fiber lasers due to the presence of a strong absorption feature near 1572 nm that resides in the Er L-Band.

In pulsed mode, however, these systems are ravaged by the effects of Stimulated Brillouin Scattering (SBS), substantially limiting the peak power available for narrow-linewidth systems [2,3]. Considering the low duty cycles required for a traditional pulsed lidar transmitter (~$1/10^4$–$1/10^3$), SBS substantially limits total average power and degrades system signal-to-noise ratio (SNR).

SUMMARY OF THE INVENTION

The invention comprises a narrow linewidth, 6 μJ-per-pulse (100 ns pulse width), micropulse LIDAR transmitter based on a low-SBS fiber with an acoustic waveguide layer. The invention utilizes a tailored and highly multimode acoustic waveguide structure surrounding an optical core, which effectively degrades both the spectral and spatial overlap between the optical field and the acoustic wave involved in the SBS interaction. The net effect is a reduction in the Brillouin gain coefficient without affecting the optical properties of a central core. As a result, a fiber with fundamental single spatial mode operation can be designed and utilized.

BRIEF DESCRIPTION OF THE DRAWINGS

Reference will be made to the drawings wherein.

DETAILED DESCRIPTION OF THE DRAWINGS

Figure 1:
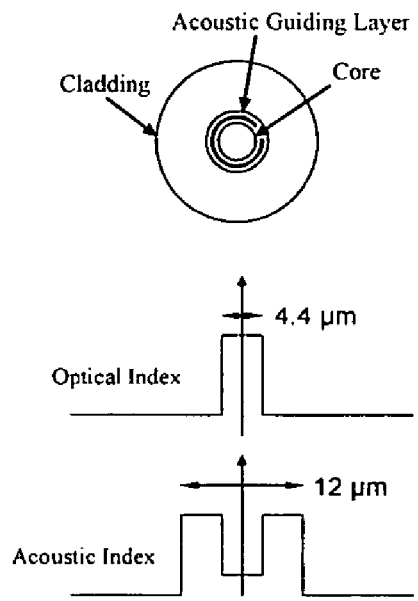
FIG. 1 of the drawings is a cross-sectional view of the low-SBS optical fiber. An acoustic waveguide surrounds the core to cause a decrease in the effective Brillouin gain coefficient. Both the optical and acoustic index profiles are provided. The fiber has a standard 125 μm cladding.

While this invention is susceptible of embodiment in many different forms, there is shown in the drawings and described herein in detail specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
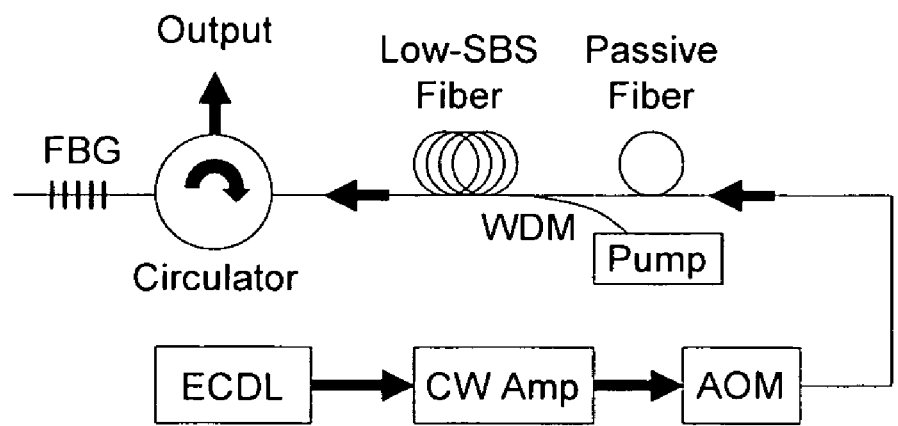
FIG. 2 of the drawings is a basic transmitter block diagram. An external cavity diode laser is CW pre-amplified and externally modulated by an acousto-optic modulator. Pulse amplification occurs in the low-SBS fiber amplifier stage. An optical circulator and a fiber Bragg grating are used to filter the ASE. The bold arrows represent optical isolators.

Referring now to the drawings, and in particular to FIG. 1, a cross sectional view of the fiber is shown. The basic transmitter setup is shown in FIG. 2. An external cavity diode laser (ECDL) which produces about 6 mW of power (Agilent 81682A) is pre-amplified with a commercial EDFA to a continuous-wave (CW) level of 200 mW. The linewidth of the ECDL can be measured using a self-heterodyne technique to be about 85 kHz.

The foregoing is then externally modulated by a fiber-coupled acousto-optic modulator (AOM). The AOM (Brimrose Corp.) operated at an acoustic frequency of 100 MHz, with a rise time of 25 ns, and FC/PC-connectorized pigtails. The device has a maximum diffraction efficiency of about 50% and a much greater insertion loss, mainly due to fiber mismatch at the connectors since the AOM employed standard single mode fiber (~9 μm diameter core) and the isolators employed smaller-core fibers (~5 μm diameter core). The net result is that 6 mW of peak power is available from the isolated AOM for all measurements.

The peak passband wavelength of the AOM was ~1531 nm when operated at an acoustic frequency of 100 MHz. Thus, we employed an ECDL wavelength of 1531 nm. To achieve other wavelengths, such as 1572 nm for the $CO_2$ application, the AOM should be optimized for the desired wavelength range.

The pulse-modulated signal is then launched into a 20 m length of low-SBS Er-doped fiber (Neolight Labs LLC™ model 111-001 low-SBS fiber, MFD ~6.7 μm at 1531 nm, $\lambda_c$~950 nm, 1000 ppm/wt. Er) via 2.5 m of passive fiber. Pump light (976 nm, grating stabilized) is coupled into the low-SBS fiber using a wavelength division multiplexer (WDM).

The output of the pulse amplifier is launched into Port 1 of an optical circulator. A fiber Bragg grating (FBG) with a reflectivity >98% and 0.25 nm bandwidth in Port 2 of the circulator redirects the output of the transmitter through Port 3, while excess ASE noise bleeds out through the FBG. The output power of the laser can be measured using a broad-area Ge detector, and the pulses can be analyzed using a fast InGaAs APD.

Because a number of isolators are used in the setup, a novel approach can be employed to determine the very beginning of the onset of SBS in the laser, before power roll-off in the transmitter begins. SBS results in a back-reflection of optical power in the last few meters of the pulse amplifier stage, and this signal is back-amplified by remaining inverted Er atoms in the first ten or so meters of fiber. Once at a critical level, this back-amplified SBS signal is then retro-reflected by SBS in the relatively long (2.5 m) length of passive fiber (~950 nm cutoff) at the input (not the Er-doped amplifier fiber), which can be easily observed at the laser output with a characteristic time delay. The passive fiber had no SBS suppression capability. All fiber lengths in the circulator and output isolator were kept less than 0.1 m to avoid SBS in the output fibers.

Figure 3:
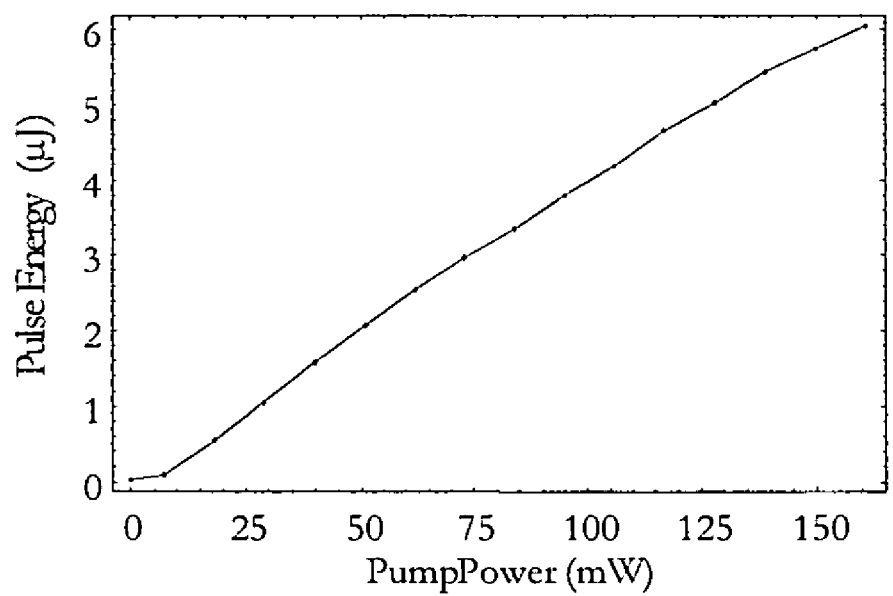
FIG. 3 of the drawings is the L-I curve for the laser transmitter. The transmitter operated at a PRF of 1 kHz with pulse width of 100 ns. The vertical axis can also be taken to be the average output power in mW.
Figure 4:
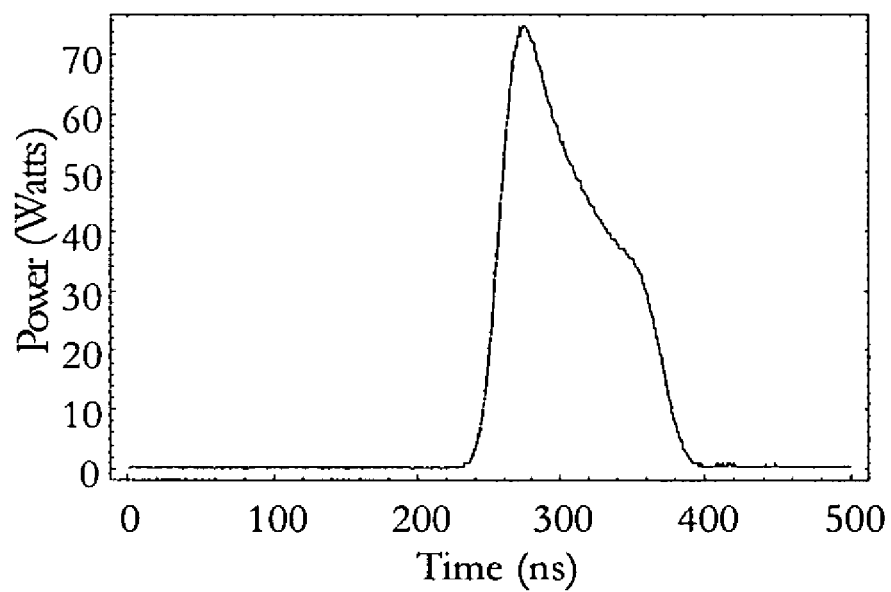
FIG. 4 of the drawings is the output pulse shape just before the onset of SBS. The absolute power scale was determined by numerically integrating the pulse into the known pulse energy.

An experiment was conducted according to the foregoing parameters. In particular, FIG. 3 provides an L-I curve for the laser transmitter operating at a pulse repetition frequency (PRF) of 1 kHz and pulse width of 100 ns. Over 6 mW of average output power (6 μJ pulse energy) was shown to be produced by the laser. FIG. 4 provides a view of the pulse shape at the maximum output power setting. The absolute power scaling was determined by numerically integrating the pulse for the known pulse energy. Although we began with a square pulse, the characteristic overshoot (pulse shaping) at the front end of the pulse is clearly visible [5].

Figure 5:
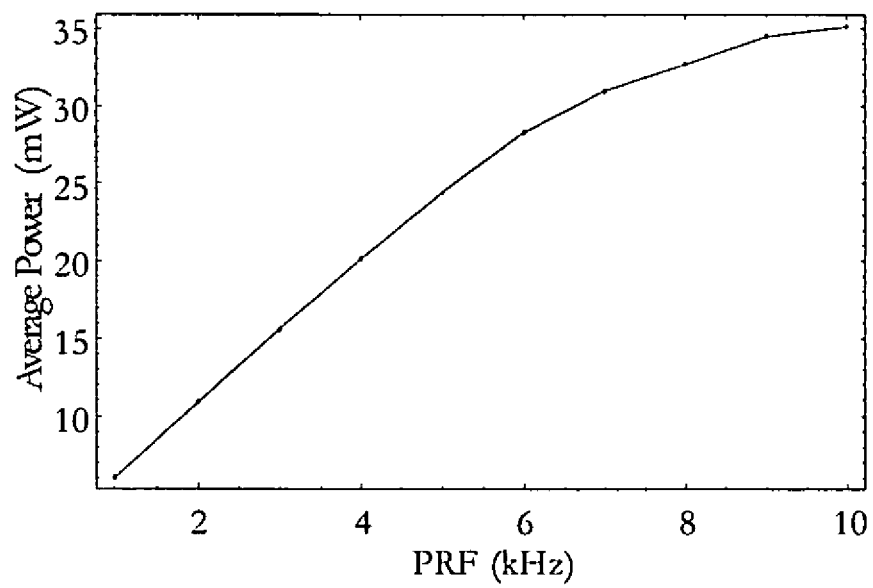
FIG. 5 of the drawings is an average output power vs. PRF for the LIDAR transmitter with pulse width of 100 ns, 6 mW of peak signal input power, and 160 mW of pump power.
Figure 6:
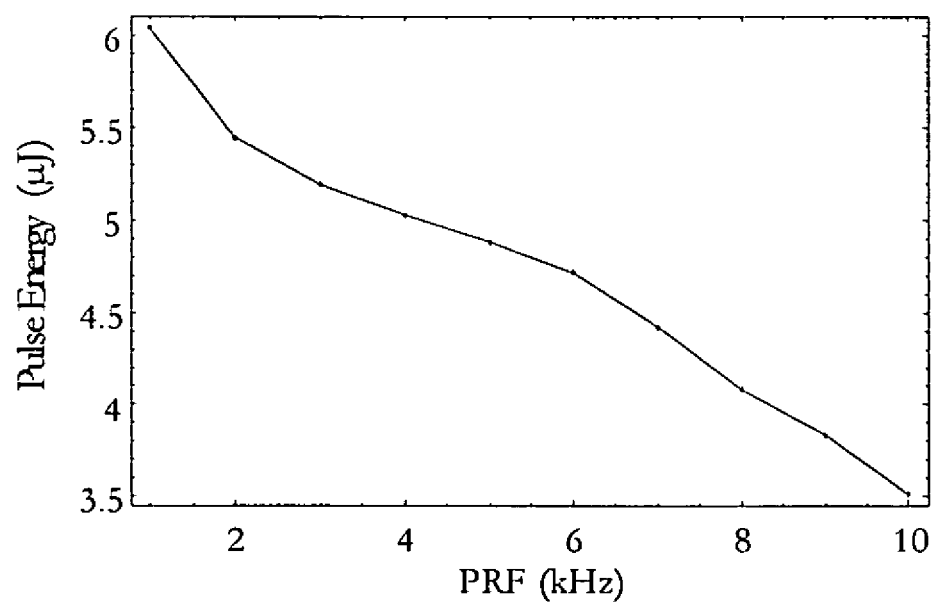
FIG. 6 of the drawings is a pulse energy vs. PRF of the LIDAR transmitter with pulse width of 100 ns, 6 mW of peak input signal power, and 160 mW of pump power.

The low-SBS pulse amplifier provided over 40 dB of gain at the signal wavelength with an average input power of 600 nW. It was also found that the AOM has a very small CW output component at the signal wavelength (~50 nW) which acted to limit the performance (pulse energy) of the amplifier at lower PRFs by bleeding power out between pulses. At higher PRFs the pulsed signal input (fixed 6 mW peak) dominated the amplifier and high conversion efficiencies were achieved. FIGS. 5 and 6 show the average power and pulse energy versus PRF for 6 mW of peak signal and 160 mW of CW pump input power into the pulse amplifier.

Figure 7:
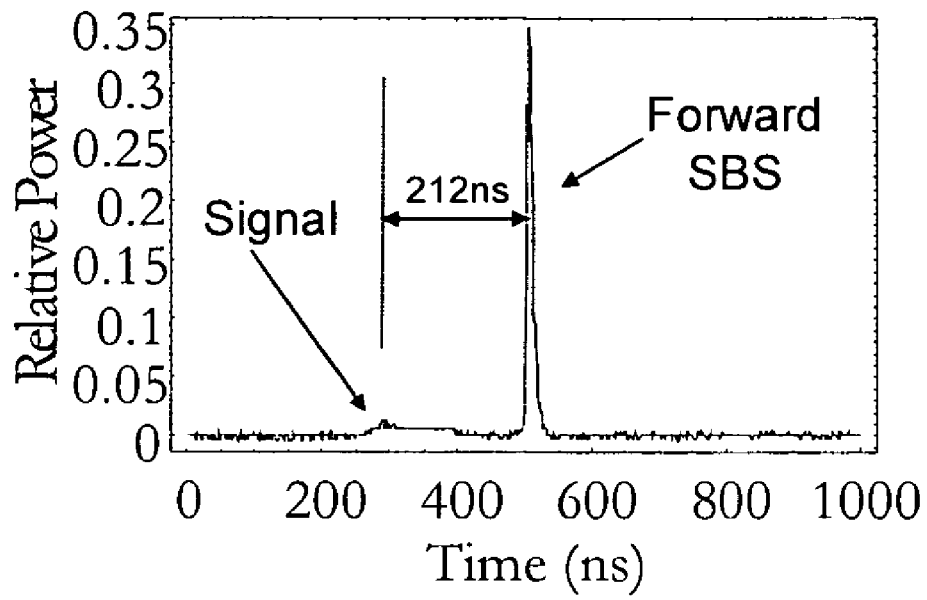
FIG. 7 of the drawings is the output SBS pulse shape. The signal power was filtered out to observe only the SBS component. SBS was first observed at a pulse energy of 6 μJ.

The forward propagating, secondary SBS signal was detectable at the output of the transmitter only at a PRF of 1 kHz and pump power of about 160 mW, or the maximum value in the L-I curve of FIG. 3. SBS was not observed at higher PRFs due to insufficient pump power to achieve the required peak power. The forward SBS pulse shape is illustrated in FIG. 7.

Since the forward SBS signal was actually much weaker than the desired signal component (~1%), the output was sent through an HP70951B OSA with monochromator option (0.1 nm resolution) to filter out the signal component in order to observe the SBS signal. FIG. 7 represents the filtered signal. The signal and forward SBS are found to be about 0.2 nm apart, or roughly twice the Brillouin shift (~25 GHz), as expected for secondary SBS. Furthermore, the LIDAR signal and forward SBS pulses are separated temporally by ~212 ns (21.8m×2) as expected since the forward SBS pulse comes from the passive fiber at the input of the pulse amplifier.

Because we were at the very beginning of the onset of SBS in the Er-doped fiber, there was insufficient power, even after amplification, to reach secondary SBS within this fiber. However, the passive fiber at the signal input end is not designed to suppress SBS, and has an MFD very similar to the Er-doped fiber. Therefore, the back-amplified SBS signal is sufficient to excite SBS in the passive fiber and the SBS threshold is reached in this fiber before the Er-doped fiber.

The forward SBS component arises when a small part of the pulse near the very peak (FIG. 4) reaches a critical level such that the back-amplified signal can reach SBS in the passive fiber at the pulse amplifier input. Since the signal power did not drop at the 6 μJ output (i.e. no power roll-over), SBS is still too weak at this point to dominate amplifier performance. However, to estimate the Brillouin gain coefficient in the low-SBS fiber, a conservative measurement would be to take the maximum peak power at the back side of the pulse in FIG. 4, or ~35 Watts.

Figure 8:
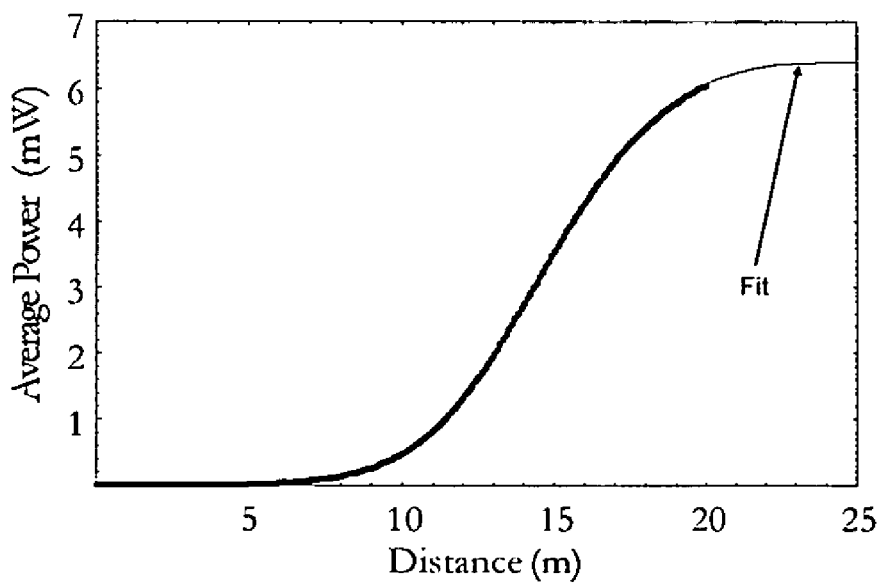
FIG. 8 of the drawings is a distribution of power in the low-SBS pulse amplifier (dark, dotted line). A Gaussian2 fit is also shown in the figure (thin solid line).

To determine the effective Brillouin gain coefficient, we begin by modeling the distribution of power in the pulsed amplifier. The result is shown in FIG. 8 (dark, dotted line), including the effects of amplified spontaneous emission and CW component through the AOM. Spectroscopic parameters found in W. J. Miniscalco, "Erbium-Doped Glasses for Fiber Amplifiers at 1500 nm," J. Lightwave Technol., vol. 9, no. 2, pp. 234-250, February 1991 can be utilized. Such an analysis is needed since the last few meters of fiber are saturated, and thus a simple exponential signal growth ($L_{eff} \sim 1/\gamma_{eff}$) is not an adequate representation of the distribution of the signal power.

The coupled amplitude equation that governs the evolution of the Stokes' signal in the fiber. This is given as $$\frac{d}{dz}P_s(z) = -g_B P_s(z) \frac{P_p(z)}{A_{eff}^p} - \gamma_B(z) P_s(z)$$

where $g_B$ is the Brillouin gain coefficient (m/W), $A_{eff}^p$ is the effective area of the laser mode, $P_s$ is the Stokes' power, $P_p$ is the laser signal power, and $\gamma_B$ is the pulse amplifier gain coefficient at the Brillouin wavelength. An assumption can be made that $\gamma_B$ is zero (i.e. the SBS signal has no gain from the fiber amplifier) and that all back SBS power is contributed to only by $g_B$. Next, we fit an analytical expression to the model for $P_p(z)$ shown in FIG. 4 and solve Eqn. 1 for $P_s(z)$. A very good model fit for the amplifier data shown in FIG. 8 is provided in Eqn. 2. This is the Gaussian function squared.

$$P_p(z) = A\exp\left(\frac{-\pi(z-B)^2}{C^2}\right)^2$$

where A, B, and C are fitting parameters. For the model shown in FIG. 8 (average power), the fitting parameters are found to be A=6.39439 mW, B=26.0334 m, and C=22.2902 m. It is very clear that the fit is quite good over the entire fiber length. The fit plot is extended to 25 m only to provide a means to distinguish the model from the analytical fit.

Plugging the second equation to the first equation, and solving the resulting differential equation, we obtain the following expression for the Stokes' power $$P_s(z) = C_o \exp\left(\frac{-Ag_B C}{4A_{eff}\pi^{1/2}} \int_{\tau(B-z)^4}^{\infty} \frac{e^{-t}}{t^{3/4}} dt\right)$$

where $C_o$ is a constant that is found from the boundary conditions.

Finally, to complete the estimate, we take an effective Stokes' input power at z=20 m to be $$h\nu_s = \frac{kT}{h\nu_a} B_{eff} \qquad [2, 3]$$

where $B_{eff}$ is the effective bandwidth (Hz) of the SBS signal, k is Boltzmann's constant, T is the fiber temperature, and $\nu_a$ is the acoustic frequency. We approximate $B_{eff}$ to be about 5 MHz. This serves as the necessary boundary condition in solving the first equation. This leads to an expression for $C_o$ below.

$$C_o = kT \frac{\nu_s}{\nu_a} B_{eff} \exp\left(\frac{+Ag_B C}{4A_{eff}\pi^{1/2}} \int_{\tau(B-L)^4}^{\infty} \frac{e^{-t}}{t^{3/4}} dt\right) \qquad (4)$$

where L is the fiber length, 20 m.

Since roll-over in the fiber amplifier was not observed, the backward (unamplified) SBS power is much less than 1% of the forward signal power. Using this value for the Stokes' power ($P_s(z=0)=0.01\ P_p^{max}=0.35$ Watts–peak), retaining all other parameters as defined before, and solving Eqn. 3 numerically for $g_B$, we obtain an effective Brillouin gain coefficient of about $0.37 \times 10^{-11}$ m/W. This value is more than an order of magnitude lower than the bulk polarized SBS gain coefficient ($5 \times 10^{-11}$ m/W). It should be noted here that the assumption of a non-depleted pump holds if the SBS power is measured when it is a small fraction of the forward power.

Because the fiber is relatively short and linearly polarized light is launched into the fiber, it is appropriate to compare our result with the bulk polarized value. Additionally, our calculation is consistent with the results in. Finally, the choice of $B_{eff}$ does not significantly affect the estimate of $g_B$. For example, if $B_{eff}$ is taken to be 1 MHz instead of 5 MHz, then the estimate for $g_B$ only changes by ~7%.

The fiber employed has an Er doping concentration of 1000 ppm/wt. Er. With the correct set of co-dopants, the quenching limit to Er doping in silica can be up to approximately 5000 ppm/wt. Such a dopant concentration would allow the fiber length to be scaled down to ⅕ of its current value, potentially allowing the scalability of the pulse energy of the transmitter to the 30-μJ pulse energy level in a 100 ns pulse, with no active spectral broadening of the ECDL.

A prerequisite for operation at much higher pulse energies is the removal of the CW component through the AOM. This requires optimization of the AOM extinction ratio. In addition, pulse shaping at the AOM would help to control the pulse overshoot observed in the transmitter pulse (FIG. 4), and potentially allow for wider pulse widths to be employed for somewhat larger pulse energies. Finally, higher PRFs would provide for higher average power. This would then require the use of much higher pump powers, potentially from Yb-doped fiber lasers near 980 nm.

Finally, single mode and narrow linewidth single-emitter lasers offering pulse energies on the order of 50 μJ become attractive for use in fiber laser arrays.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. An apparatus, comprising:
    a narrow linewidth micropulse LIDAR transmitter having a low-SBS fiber multimode acoustic waveguide structure having an acoustic waveguide layer surrounding an optical core; and
    both the layer and core being structured such that both a spectral and spatial overlap between an optical field and an acoustic wave involved in an SBS interaction is degraded, resulting in a reduction of a Brillouin gain coefficient of the fiber without substantially affecting optical properties of the core of the fiber.

2. The apparatus according to claim 1, wherein the fiber has a fundamental single spatial mode operation.

3. An apparatus, comprising:
    a narrow linewidth micropulse LIDAR transmitter having a low-SBS single clad, small-mode-area optical fiber; and
    the low-SBS single clad, small-mode-area optical fiber structured being an erbium doped fiber with an acoustic waveguide that is structured to produce narrow-linewidth peak powers.

4. The apparatus according to claim 3, wherein at least a predetermined value of energy per pulse is achieved before a weak form of stimulated Brillouin scattering appears.

5. The apparatus according to claim 4, wherein the predetermined value of energy is 6 μJ per pulse for substantially a 100 ns pulse width of the pulse.

6. An apparatus, comprising:
    a narrow linewidth micropulse LIDAR transmitter having a low-SBS optical fiber;
    wherein narrow-line width peak powers are achieved through use of an erbium doped fiber with an acoustic waveguide.

7. The apparatus according to claim 6, wherein a predetermined value of energy per pulse is achieved before a weak form of stimulated Brillouin scattering appears.

8. The apparatus according to claim 6, wherein the low-SBS optical fiber is a single clad, small-mode-area optical fiber.

9. The apparatus according to claim 6, wherein the low-SBS optical fiber is a dual clad fiber.

10. The apparatus according to claim 6, wherein the low-SBS optical fiber has an acoustically tailored core.

11. The apparatus according to claim 6, wherein the low-SBS optical fiber has a graded index acoustic profile.

12. The apparatus according to claim 6, wherein the low-SBS optical fiber has an exacerbated net acoustic attenuation coefficient.

13. An apparatus, comprising: a narrow linewidth seed laser;
    a continuous-wave amplifier operatively coupled to the seed laser;
    a fiber-coupled intensity modulator operatively coupled to the continuous-wave amplifier;
    a passive fiber operatively coupled to the fiber-coupled intensity modulator;
    a source of pump light;
    a low-SBS fiber operatively coupled to the passive fiber and to the source of pump light via a wavelength division multiplexer;
    an optical circulator having first, second, and third ports, the first port operatively coupled to the low-SBS fiber; and
    a fiber Bragg grating operatively coupled to port 2 of the optical circulator;
    wherein the circulator redirects output through port 3, while excess ASE noise bleeds out through the fiber Bragg grating.

14. The apparatus according to claim 13, wherein the low-SBS fiber is an Er-doped fiber.

15. The apparatus according to claim 13, wherein the apparatus consists of at least one additional pulse-amplifier stage located either before or after the circulator stage.

16. The apparatus according to claim 13, wherein the passive fiber has no SBS suppression capability.

17. The apparatus according to claim 13, wherein the passive fiber has SBS suppression capability.

18. The apparatus according to claim 13, wherein all fiber lengths in the circulator and output isolator are less than 0.1 m to avoid SBS in output fibers of the apparatus.

19. The apparatus according to claim 13, wherein the low-SBS optical fiber is one of a single clad, small-mode-area optical fiber, and a dual clad fiber.

* * * * *